US012029286B1

(12) United States Patent
Grimmett et al.

(10) Patent No.: US 12,029,286 B1
(45) Date of Patent: Jul. 9, 2024

(54) COMBINATION ZIPPER AND AUDIO PLAYER

(71) Applicants: Adam D. Grimmett, Eastport, NY (US); Harry Oliver Pell, Washingtonville, NY (US)

(72) Inventors: Adam D. Grimmett, Eastport, NY (US); Harry Oliver Pell, Washingtonville, NY (US)

( * ) Notice: Subject to any disclaimer, the term of this patent is extended or adjusted under 35 U.S.C. 154(b) by 0 days.

(21) Appl. No.: 18/443,409

(22) Filed: Feb. 16, 2024

(51) Int. Cl.

| | |
|---|---|
| ***A44B 19/24*** | (2006.01) |
| ***A44B 19/06*** | (2006.01) |
| ***H04R 1/02*** | (2006.01) |
| ***H04R 3/00*** | (2006.01) |

(52) U.S. Cl.
CPC ............ *A44B 19/24* (2013.01); *H04R 1/025* (2013.01); *H04R 1/028* (2013.01); *H04R 3/00* (2013.01); *A44B 19/06* (2013.01); *H04R 2201/023* (2013.01)

(58) Field of Classification Search
CPC ........ A44B 19/24; A44B 19/06; H04R 1/025; H04R 1/028; H04R 3/00; H04R 2201/023
See application file for complete search history.

(56) References Cited

U.S. PATENT DOCUMENTS

| | | | |
|---|---|---|---|
| 4,603,327 | A | 7/1986 | Leonard et al. |
| 4,683,587 | A | 7/1987 | Silverman |
| 6,801,140 | B2 | 10/2004 | Mäntyjärvi et al. |
| 7,304,600 | B2 | 12/2007 | Nehls et al. |
| 2006/0164280 | A1 | 7/2006 | Nehls et al. |
| 2007/0236361 | A1 | 10/2007 | Farhadian |
| 2009/0195400 | A1 | 8/2009 | Oreshkin |
| 2010/0038276 | A1 | 2/2010 | Chen |

(Continued)

FOREIGN PATENT DOCUMENTS

| | | | | | |
|---|---|---|---|---|---|
| CN | 109497659 | A | * | 3/2019 | ............ A44B 19/00 |
| DE | 102011075455 | A1 | | 8/2012 | |
| KR | 20100127527 | A | * | 12/2010 | ............ A44B 19/08 |

OTHER PUBLICATIONS

Translation of KR20100127527A Min et al., Electric Connecting Device Using Zipper, 2010.*

(Continued)

*Primary Examiner* — Andrew Sniezek
(74) *Attorney, Agent, or Firm* — Nath, Goldberg & Meyer; Joshua B. Goldberg

(57) ABSTRACT

The combination zipper and audio player includes an audio system for playing prerecorded audio when the zipper is opened to a predetermined degree. The zipper is a conventional zipper including first and second flexible panels, first and second sets of zipper teeth secured to respective edges of the first and second flexible panels, and a zipper slider which is slidably mounted on the first and second sets of zipper teeth. The zipper slider is made from an electrically conductive material. First and second electrical contacts are respectively secured to the first and second flexible panels respectively adjacent the first and second sets of zipper teeth. An audio module is in electrical communication with the first and second electrical contacts, and a speaker is in electrical communication with the audio module. The audio module and the speaker are contained within a waterproof housing and are configured to play the prerecorded audio.

3 Claims, 5 Drawing Sheets

(56) References Cited

U.S. PATENT DOCUMENTS

| | | | |
|---|---|---|---|
| 2010/0051150 A1 | 3/2010 | Chang et al. | |
| 2018/0068549 A1 | 3/2018 | Tourrette et al. | |
| 2018/0324509 A1 | 11/2018 | Muller, III et al. | |
| 2019/0059340 A1 | 2/2019 | Brown | |
| 2019/0077577 A1* | 3/2019 | Brandes ................. | H04R 1/028 |
| 2021/0289892 A1 | 9/2021 | Tourrette et al. | |
| 2023/0218046 A1 | 7/2023 | Dolos | |

OTHER PUBLICATIONS

Translation of CN-109497659-A, Shixing et al., Anti-Theft Zipper, 2019.*

Translation of KR20100127527A (Year: 2010).*

"MultiPlay Re-recordable Sound Chip for Greeting Cards | Plays Different Recording Each Time Activated | Add the Power of Sound to Recordable Cards, Scrapbooks, Photo Albums, Personalized Gifts, Crafts"; printed on Jan. 31, 2024 from https://www.amazon.com/MultiPlay-Re-recordable-Recordable-Scrapbooks-Personalized/dp/B0845SFNG6/ref=cm_cr_arp_d_product_top?ie=UTF8.

"30s DIY Greeting Card Module, Light Sense Voice Sound, Record Chip, Recordable Voice Module, Greeting Card Chip, for Christmas Cards, Gift Boxes (#1)"; printed on Jan. 31, 2024 from https://www.amazon.com/Greeting-Module-Record-Recordable-Christmas/dp/B0C6LYS4YW/ref=sr_1_73?keywords=Recordable%2BMusic%2BSound%2BVoice%2BRecording%2BModule%2BDevice%2BChip%2B0.25W%2Bwith%2BButton%2BBattery%2Bfor%2BGreeting%2BCard&qid=1706714577&sr=8-73&th=1.

"XLW Module—16MB Push Button Activated Sound Module with Speaker, Type-C Cable, and Easy Recording Capability 16 Minutes for Personalized Greetings, DIY Projects, and Holiday Crafts (Blue-2Pack)"; printed on Jan. 31, 2024 from https://www.amazon.com/XLW-Module-Capability16-Personalized-Blue-2Pack/dp/B0C491SSSK/ref=cm_cr_arp_d_product_top?ie=UTF8&th=1.

"Record Chip for Greeting Card, 4mins DIY Recordable Greeting Card Module, Voice Sound Record Module for Christmas Cards, Gift Boxes, Jewelry Boxes, Crafts, Children's Toys(Single Play)"; printed on Jan. 31, 2024 from https://www.amazon.com/Diyeeni-Greeting-Recordable-Christmas-Childrens/dp/B07X1SQGKG/ref=cm_cr_arp_d_product_top?ie=UTF8&th=1.

"Waterproof Recordable Sound Module, Sound Module"; printed on Feb. 16, 2024 from http://www.astsoundmodule.com/waterproof-sound-module/65.html.

* cited by examiner

COMBINATION ZIPPER AND AUDIO PLAYER

BACKGROUND

Field

The disclosure of the present patent application relates to closures, and particularly to a combination zipper and audio player for the playback of prerecorded audio when the zipper is opened.

Description of Related Art

Small portable audio players attached to various articles are well known. For example, greetings cards which play prerecorded audio when opened have been commercially available for decades. Such audio players are typically designed for a singular purpose; i.e., it would be difficult to install the same type of audio player into a different type of article. Moreover, such audio players are typically manufactured to be disposable with a very limited lifetime. For this reason, protection against accidental exposure to water and other types of damage is typically not considered when the audio players are manufactured. Thus, a combination zipper and audio player solving the aforementioned problems is desired.

SUMMARY

The combination zipper and audio player includes an audio system for playing prerecorded audio when the zipper is opened to a predetermined degree. The zipper is a conventional zipper including first and second flexible panels, first and second sets of zipper teeth secured to respective edges of the first and second flexible panels, and a zipper slider which is slidably mounted on the first and second sets of zipper teeth to selectively interlock or separate the first and second sets of zipper teeth. The zipper slider is made from an electrically conductive material, such as, but not limited to, brass, aluminum, nickel, stainless steel, or the like.

A first electrical contact is secured to the first flexible panel adjacent the first set of zipper teeth and a second electrical contact is secured to the second flexible panel adjacent the second set of zipper teeth. An audio module is in electrical communication with the first and second electrical contacts, and a speaker is in electrical communication with the audio module. The audio module and the speaker are contained within a waterproof housing. The audio module is configured to transmit audio signals to the speaker when the zipper slider is in electrical contact with the first and second electrical contacts, where the audio signals are representative of prerecorded audio for playback by the speaker.

The first and second electrical contacts are electrically connected to the audio module by first and second wires or the like, respectively. An electrical connector having first and second connectible members releasably electrically connected to one another may be provided, such that the first and second wires are electrically connected to the first connectible member and third and fourth wires are electrically connected to the second connectible member of the electrical connector and to the audio module.

The zipper may be attached to a sheet, such as a fabric sheet, a flexible panel, or the like, such that the zipper selectively opens and closes a slit formed in the sheet. Non-limiting examples of such a sheet include the front portion of a pair of pants, the front of a jacket, a portion of a bag or purse, a portion of a backpack, a portion of a pencil case, etc. The audio module, the speaker and the waterproof housing may be releasably attached to the sheet. As a non-limiting example, the waterproof housing, which contains the audio module and the speaker, may be releasably attached to the sheet by a hook and loop fastener or the like.

By sealing the audio module and the speaker within the waterproof housing, the combination zipper and audio player may be washed along with a garment, bag, etc. to which it is attached. Protection is also provided against inclement weather or any other situation involving exposure to water or other liquids.

These and other features of the present subject matter will become readily apparent upon further review of the following specification.

BRIEF DESCRIPTION OF DRAWINGS

Similar reference characters denote corresponding features consistently throughout the attached drawings.

DETAILED DESCRIPTION

Figure 1:
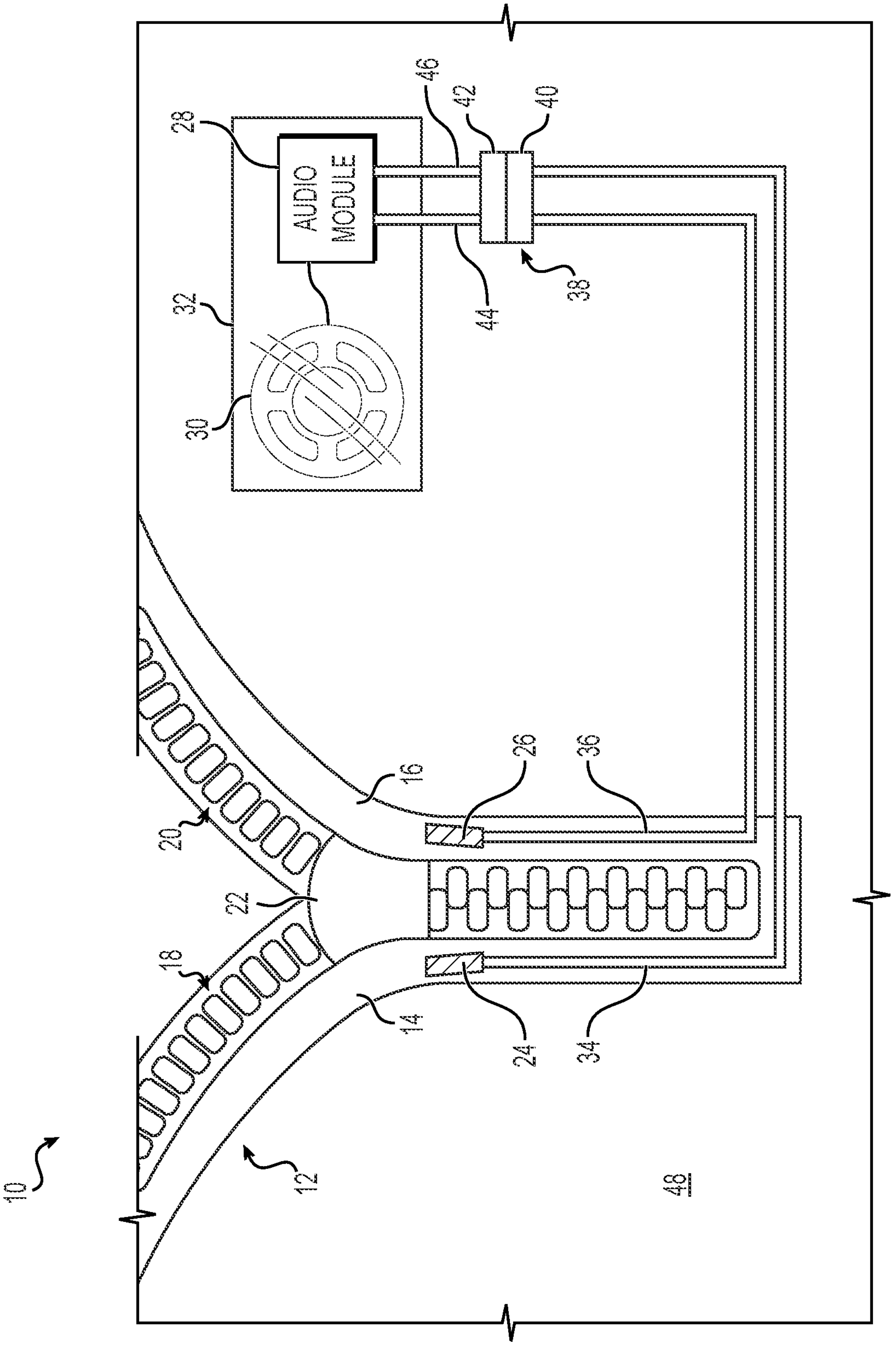
FIG. 1 is a rear view of a combination zipper and audio player with a circuit thereof in an open state.
Figure 2:
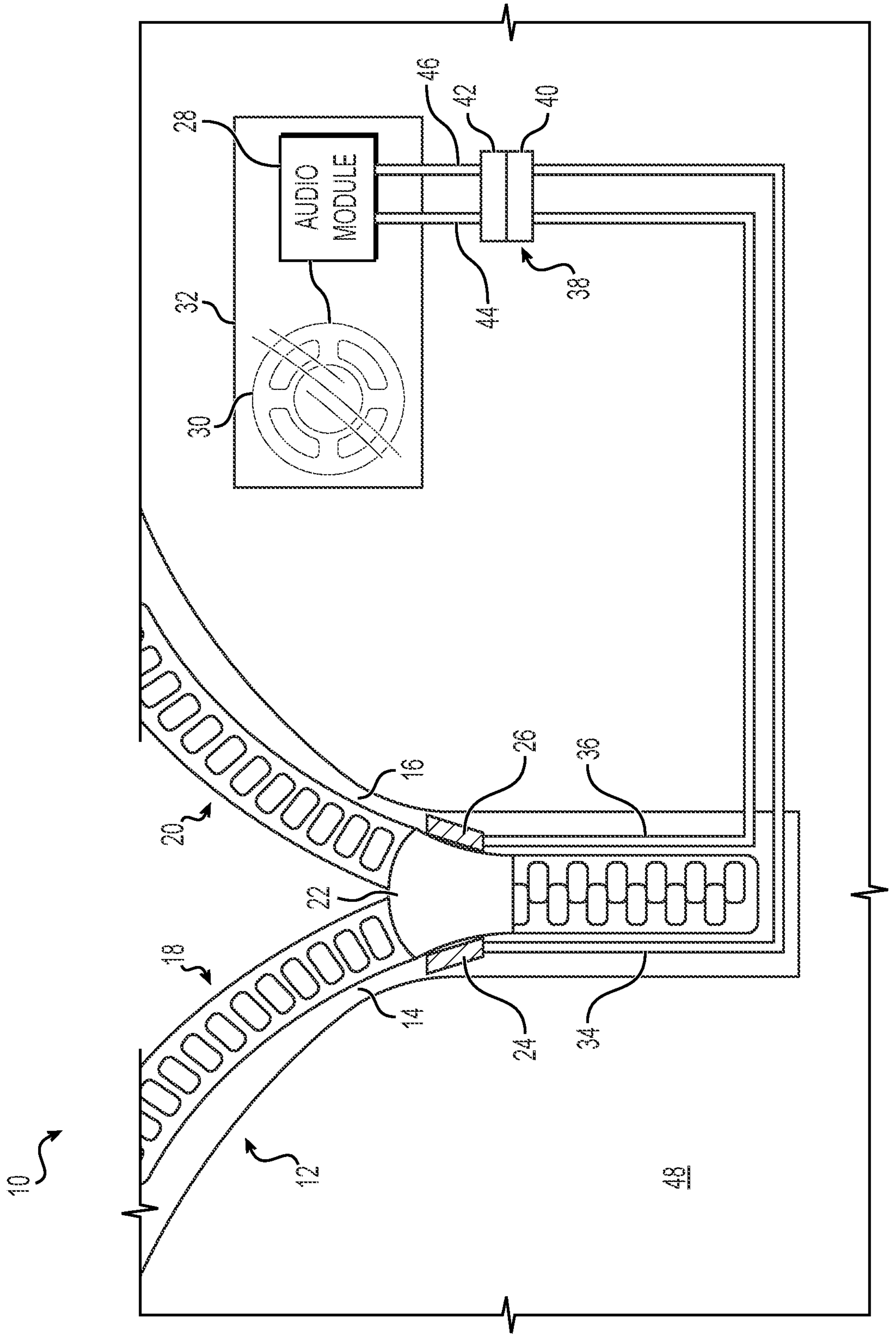
FIG. 2 is a rear view of the combination zipper and audio player with the circuit thereof in a closed state.

Referring now to FIGS. 1 and 2, the combination zipper and audio player 10 includes an audio system for playing prerecorded audio when the zipper 12 is opened to a predetermined degree. The zipper 12 is a conventional zipper including first and second flexible panels 14, 16, which may be made of fabric or the like, first and second sets of zipper teeth 18, 20 secured to respective edges of the first and second flexible panels 14, 16, and a zipper slider 22 which is slidably mounted on the first and second sets of zipper teeth 18, 20 to selectively interlock or separate the first and second sets of zipper teeth 18, 20. It should be understood that zipper 12 is shown for exemplary purposes only and may be any suitable type of zipper, as is well-known in the art. The zipper slider 22 is made from an electrically conductive material, such as, but not limited to, brass, aluminum, nickel, stainless steel or the like.

A first electrical contact 24 is secured to the first flexible panel 14 adjacent the first set of zipper teeth 18 and a second electrical contact 26 is secured to the second flexible panel 16 adjacent the second set of zipper teeth 20. An audio module 28 is in electrical communication with the first and second electrical contacts 24, 26, and a speaker 30 is in electrical communication with the audio module 28. The audio module 28 and the speaker 30 are contained within a waterproof housing 32. The audio module 28 is configured to transmit audio signals to the speaker 30 when the zipper slider 22 is in electrical contact with the first and second electrical contacts 24, 26, where the audio signals are representative of prerecorded audio for playback by the speaker 30. By adjusting the relative height or position of the first and second electrical contacts 24, 26 when they are attached to the first and second flexible panels 14, 16, respectively, the extent to which zipper 12 must be opened to initiate audio playback may be selected.

Speaker 30 may be any suitable type of speaker, and audio module 28 may be any suitable type of audio module for playing prerecorded audio through the speaker. When the electrically conductive zipper slider 22 makes electrical contact with both of the first and second electrical contacts 24, 26, the zipper slider 22 closes a circuit (i.e., the combination of zipper slider 22 and the first and second electrical contacts 24, 26 serve as a switch) to initiate audio playback. Further, it should be understood that waterproof housing 32 may be any suitable type of waterproof housing, such as a sealed plastic bag or the like. It should be further understood that the shape and relative dimensions of waterproof housing 32 are shown in FIGS. 1 and 2 for exemplary purposes only.

Figure 5:
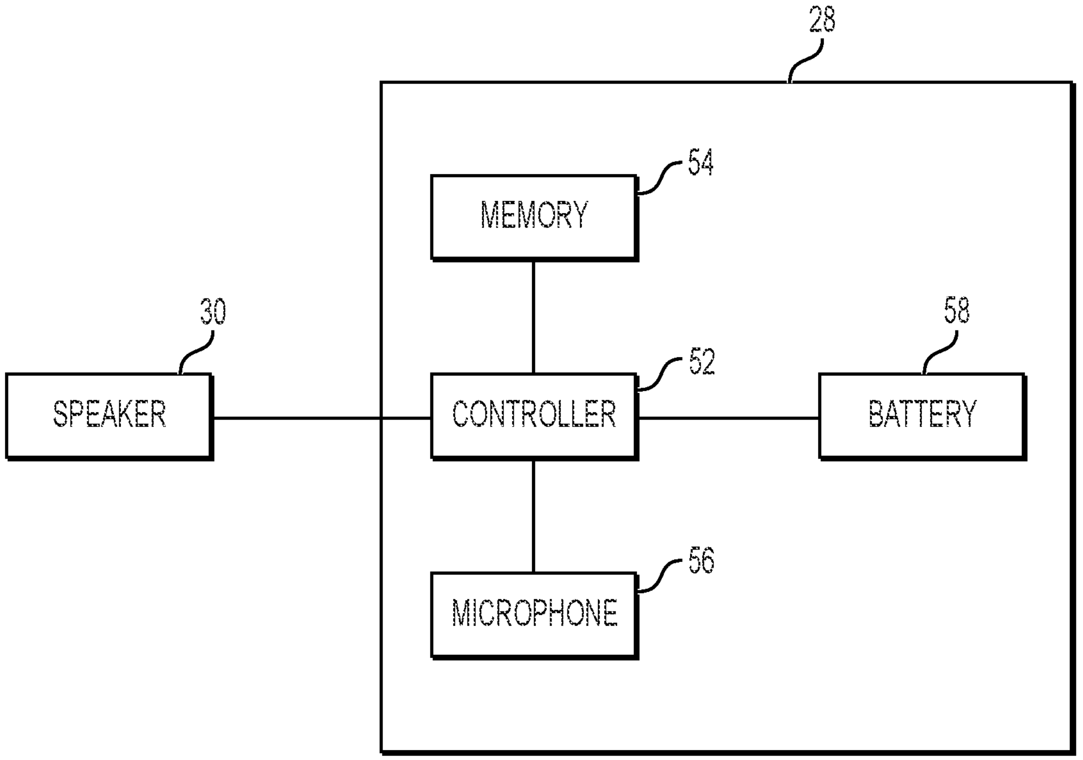
FIG. 5 is a block diagram illustrating system components of the audio module.

It should be understood that any suitable type of audio module may be used. As a non-limiting example, audio module 28 may be the "Waterproof Recordable Sound Module" (model no. S-3022) manufactured by AST Industry Co., LTD of China. As shown in FIG. 5, the audio module 28 may include a controller 52, which may be a processor, a microprocessor, control circuitry or the like, in communication with memory 54. The memory 54 stores audio which may be recorded by a microphone 56. It should be understood that the speaker 30 may alternatively be used as a microphone or, as a further alternative, the audio may be uploaded or otherwise transmitted directly into memory 54 without the need for a microphone. It should be understood that memory 54 may be any suitable type of non-transitory memory, including, but not limited to, semiconductor memory (for example, RAM, ROM, etc.), a magnetic recording apparatus, an optical disk, a magneto-optical disk, etc. The audio module 28 and the speaker 30 may be powered by a battery 58, which may be, for example, a rechargeable battery or a replaceable battery.

It should be understood that audio module 28 may include additional components, such as, but not limited to, lights, visual indicators, charging ports for charging the battery 58, etc. Further, it should be understood that any suitable length of audio recording may be recorded in memory 54. As a non-limiting example, memory 58 may be configured to record up to 30 seconds of audio.

The first and second electrical contacts 24, 26 are electrically connected to the audio module 28 by first and second wires 34, 36 or the like, respectively. The first and second wires 34, 36 are preferably coated with a waterproof insulating material, such as silicone or the like, in order to prevent corrosion, water retention or accidental closure of the circuit. An electrical connector 38 having first and second connectible members 40, 42, respectively, which are releasably electrically connected to one another, may be provided. Using the electrical connector 38, the first and second wires 34, 36 may be electrically connected to the first connectible member 40 and third and fourth wires 44, 46 may be electrically connected to the second connectible member 42 and to the audio module 28. It should be understood that electrical connector 38 may be any suitable type of electrical connector, such as a plug-and-socket connector, a locking clip connector or the like. In use, the electrical connector 38 allows the audio module 28 to be disconnected from the electrical leads 24, 26.

Figure 4:
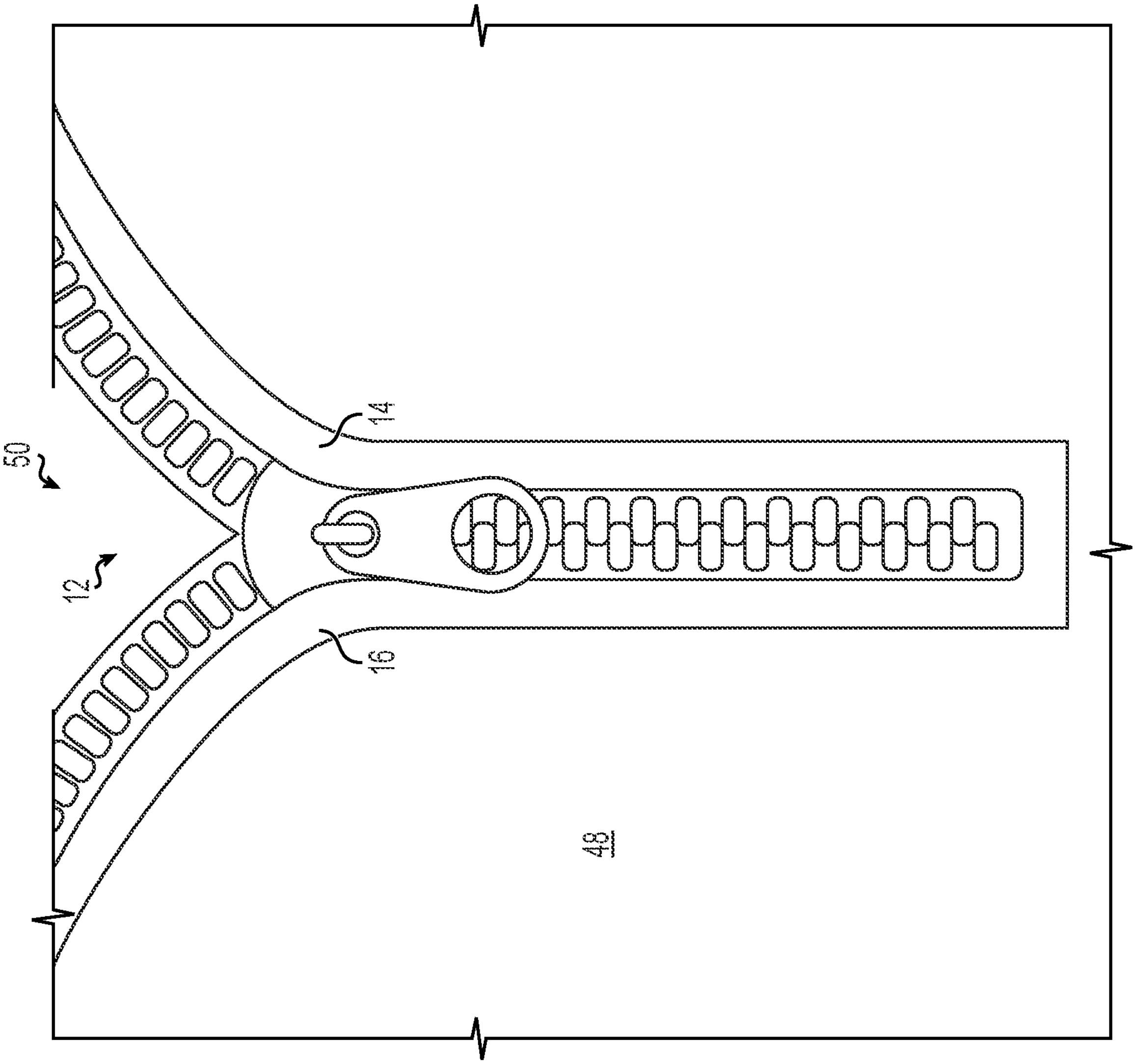
FIG. 4 is a front view of the combination zipper and audio player.

As shown in FIG. 4, when the audio module 28, speaker 30 and waterproof housing 32 are attached to the rear of a sheet 48, only the front portion of zipper 12 is visible; i.e., in use, the addition of the audio module 28, the speaker 30 and the waterproof housing 32 will not alter the outward appearance of the article to which they are applied. As is conventionally known, the zipper 12 is provided for selectively opening and closing a slit 50 formed in the sheet 48. Non-limiting examples of such a sheet include the front portion of a pair of pants, the front of a jacket, a portion of a bag or purse, a portion of a backpack, a portion of a pencil case, etc. It should be understood that the combination zipper and audio player 10 may replace any conventional zipper in any conventional garment, bag, etc. in order to add audio capabilities thereto.

Figure 3:
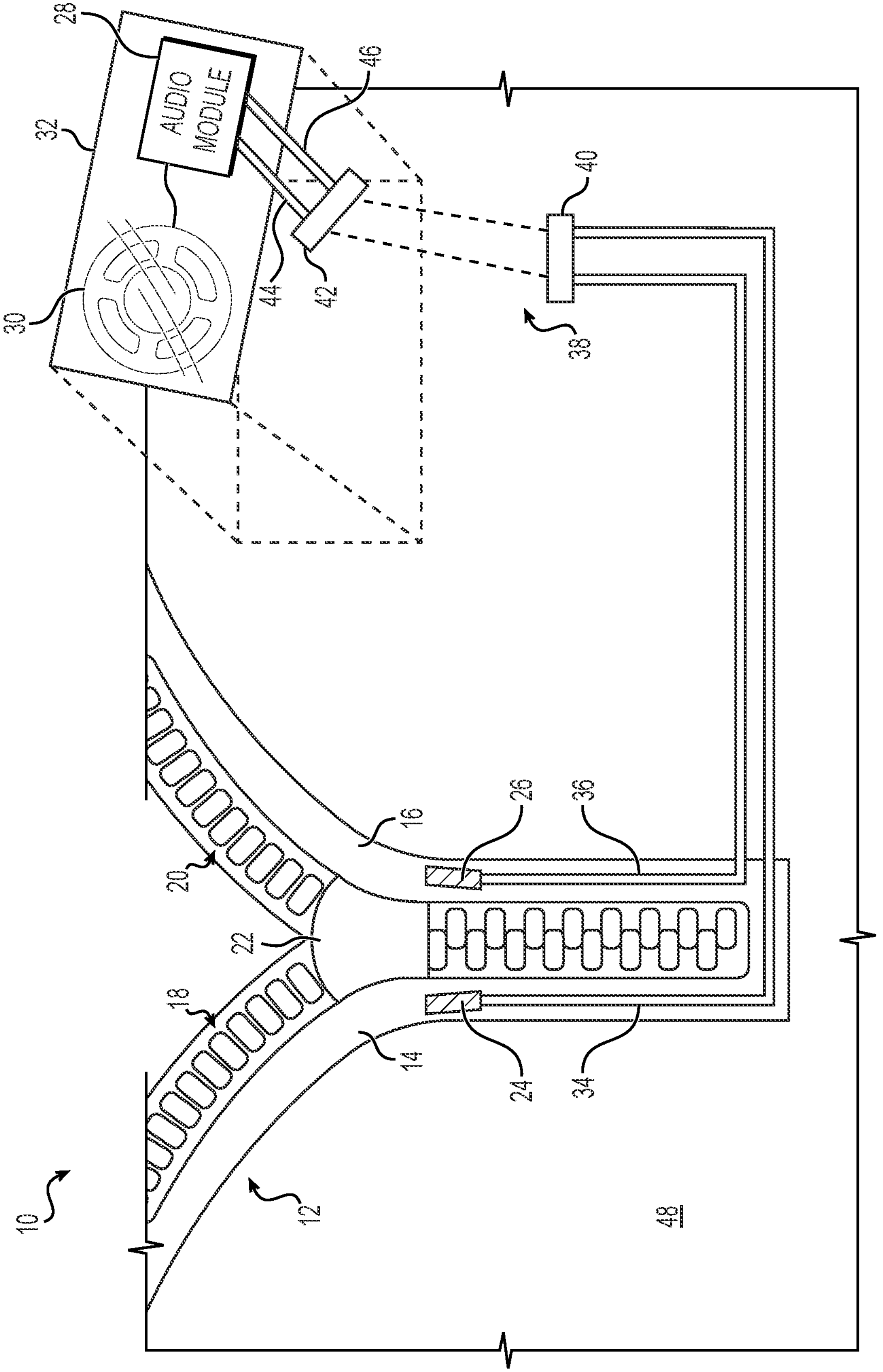
FIG. 3 is a rear view of the combination zipper and audio player showing an audio module, speaker and waterproof housing thereof being removed.

As shown in FIG. 3, the audio module 28, the speaker 30 and the waterproof housing 32 may be releasably attached to the sheet 48. As a non-limiting example, the waterproof housing 32, which contains the audio module 48 and the speaker 30, may be releasably attached to the sheet 48 by a hook and loop fastener or the like. During removal, the electrical connector 38 is disconnected, allowing the waterproof housing 32 and the second connectible member 42 of the electrical connector 38 to be removed.

By sealing the audio module 28 and the speaker 30 within the waterproof housing 32, and by coating the first and second wires 34, 36 with waterproof insulating material, such as silicone or the like, the combination zipper and audio player 10 may be washed along with the garment, bag, etc. to which it is attached. Protection is also provided against inclement weather or any other situation involving exposure to water or other liquids.

It is to be understood that the combination zipper and audio player is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:

1. A combination zipper and audio player, comprising:

a zipper comprising:
- a first flexible panel;
- a second flexible panel;
- a first set of zipper teeth secured to an edge of the first flexible panel;
- a second set of zipper teeth secured to an edge of the second flexible panel; and
- a zipper slider slidably mounted on the first and second sets of zipper teeth to selectively interlock or separate the first and second sets of zipper teeth, wherein the zipper slider is made from an electrically conductive material;

a first electrical contact secured to the first flexible panel adjacent the first set of zipper teeth;

a second electrical contact secured to the second flexible panel adjacent the second set of zipper teeth;

an audio module in electrical communication with the first and second electrical contacts, wherein the first and second electrical contacts are electrically connected to the audio module by first and second wires, respectively;

a speaker in electrical communication with the audio module;

a waterproof housing; and an electrical connector having first and second connectible members releasably electrically connected to one another;

wherein the audio module and the speaker are contained within the waterproof housing, wherein the first and second wires are electrically connected to the first connectible member of the electrical connector and third and fourth wires are electrically connected to the second connectible member of the electrical connector and to the audio module, and wherein the audio module is configured to transmit audio signals to the speaker when the zipper slider is in electrical contact with the first and second electrical contacts, the audio signals being representative of prerecorded audio for playback by the speaker.

2. The combination zipper and audio player as recited in claim 1, further comprising a sheet having a slit formed therein, wherein the zipper is attached to the sheet to selectively open and close the slit.

3. The combination zipper and audio player as recited in claim 2, wherein the audio module, the speaker and the waterproof housing are releasably attached to the sheet.

* * * * *